(12) United States Patent
Li et al.

(10) Patent No.: US 10,033,720 B2
(45) Date of Patent: Jul. 24, 2018

(54) METHOD AND SYSTEM FOR CREATING A CERTIFICATE TO AUTHENTICATE A USER IDENTITY

(71) Applicant: Futurewei Technologies Inc., Plano, TX (US)

(72) Inventors: Li Li, Bridgewater, NJ (US); Tao Cai, Shenzhen (CN); Wu Chou, Basking Ridge, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 111 days.

(21) Appl. No.: 14/723,350

(22) Filed: May 27, 2015

(65) Prior Publication Data
US 2015/0350198 A1 Dec. 3, 2015

Related U.S. Application Data

(60) Provisional application No. 62/003,980, filed on May 28, 2014.

(51) Int. Cl.
*H04L 29/06* (2006.01)
*G06F 21/64* (2013.01)
*H04L 9/32* (2006.01)

(52) U.S. Cl.
CPC ........ *H04L 63/0823* (2013.01); *G06F 21/645* (2013.01); *H04L 9/3265* (2013.01); *H04L 9/3268* (2013.01); *H04L 63/168* (2013.01)

(58) Field of Classification Search
CPC . H04L 63/0823; H04L 9/3263; H04L 9/3268; H04L 9/3265; H04L 63/168;
(Continued)

(56) References Cited

U.S. PATENT DOCUMENTS 6,438,690 B1 * 8/2002 Patel .................. G06Q 20/02
380/30
8,365,257 B1  1/2013 Causey et al.
(Continued)

FOREIGN PATENT DOCUMENTS

| CN | 101102187 A | 1/2008 |
| CN | 102946314 A | 2/2013 |
| WO | 2010107298 A2 | 9/2010 |

OTHER PUBLICATIONS

Supplementary Extended European Search Report issued in corresponding EP Application No. 15799444.3 dated May 8, 2017, 8 Pages.

*Primary Examiner* — Ashok Patel
*Assistant Examiner* — Quazi Farooqui
(74) *Attorney, Agent, or Firm* — Vierra Magen Marcus LLP (57) ABSTRACT

A method for creating a certificate to authenticate a user identity at a web browser includes receiving a login request including a first user identity for a user and generating a first browser-signed certificate using public and secret keys associating the first user identity to the web browser. The first browser-signed certificate is sent to a first identity provider server and in response a first server-signed certificate is received from the first identity provider server. The first server-signed certificate associates the first user identity to the first identity provider server. A final certificate is generated by merging the first browser-signed certificate with the first server-signed certificate.

22 Claims, 10 Drawing Sheets

(58) Field of Classification Search
CPC ..... H04L 63/08; H04L 67/10; H04L 63/0815;
G06F 21/33; G06F 21/645
USPC .................... 726/5–7, 18; 713/155–157, 175
See application file for complete search history.

(56) References Cited

U.S. PATENT DOCUMENTS

| | | | |
|---|---|---|---|
| 2003/0126431 A1* | 7/2003 | Beattie | G06F 21/6218 713/156 |
| 2008/0304669 A1* | 12/2008 | Bugbee | H04L 9/0894 380/278 |
| 2009/0240936 A1* | 9/2009 | Lambiase | H04L 63/0272 713/156 |
| 2009/0300747 A1* | 12/2009 | Ahn | G06F 21/34 726/9 |
| 2010/0154050 A1* | 6/2010 | Mukkara | H04L 12/4641 726/15 |
| 2013/0145151 A1 | 6/2013 | Brown et al. | |
| 2013/0268755 A1 | 10/2013 | Simmons et al. | |
| 2014/0201520 A1* | 7/2014 | Yacobi | H04L 9/3073 713/158 |

\* cited by examiner

| Notation | Meaning |
| --- | --- |
| cert_{x/s...}...} | A certificate that contains identity x and its signature s (note: a certificate may also contain a secret key in order to simplify its description) |
| cert_{x}=gen(x) | Generate a self-signed certificate cert_{x} with both public and secret keys for identity x (note: a certificate may contain multiple subkeys for signing and encryption) |
| cert_{y}=add(y, cert) | Add a new identity y to an existing certificate |
| cert_{x/s}=certify(cert_{s}, cert_{x}) | Sign an identity x in a certificate by another certificate with secret key and identity s (with URI and an expiry date defined by the signer) |
| true=check(cert_{s}, cert{x/s}) | Verify that s certified identity x and that the signature has not expired |
| full=validate(cert_{x}, TS) | Validate a certificate by a set of trust specifications TS (i.e. find a trust chain from TS to identity x according to Web-of-Trust model) |
| cert3=merge(cert1, cert2) | Merge two certificate trees with the same public key into one certificate |
| g=sign(cert, string) | Sign a string by a certificate containing a secret key to produce a signature g |
| true=verify(cert, string, g) | Verifies the signature g on a string with a certificate |

METHOD AND SYSTEM FOR CREATING A CERTIFICATE TO AUTHENTICATE A USER IDENTITY

CROSS-REFERENCE TO RELATED APPLICATIONS

This Application claims the benefit of U.S. Provisional Application No. 62/003,980 filed May 28, 2014 entitled PGP-STYLE USER IDENTITIES FROM MULTIPLE IDENTITY PROVIDERS, which is hereby incorporated by reference herein.

TECHNICAL FIELD

Embodiments of the present invention generally relate to identity certification. More specifically, embodiments of the present invention relate to identity certification for secure internet browsing and particularly a method and system for creating a certificate to authenticate a user identity.

BACKGROUND

Real-time communication in web browsers (RTCWEB) security architecture is based on federated identity systems in which browsers rely on third-party Identity Providers (IdP) to provide several services. Examples of IdPs include OpenID, OAuth, and Mozilla Persona. One service is to cryptographically bind Datagram Transport Layer Security (DTLS) certificate fingerprints to user identities such that the users are ensured that the encrypted media streams (i.e. Secure Real-time Transport Protocol (SRTP)) are coming from and going to sources owned by the authenticated users. Another service is to allow users to authenticate each other during call initiation through IdPs that are independent of the calling sites. For example, two users can authenticate each other with their social media accounts with a calling application from a poker site.

Users may want an identity to be verifiable by a different IdP to avoid single point of failure or traffic bottleneck. In current identity protocols, each user identity is tied to one IdP and there is only one verification path for each identity. In some cases, all the critical IdPs may become unavailable but the network still allows the browsers to communicate in a point-to-point (P2P) fashion. Current identity protocols do not support such direct authentications between users. For various reasons, a user may want to replace an old identity by a new one, without losing the connection between the two. However, the current identity protocols do not allow one identity to be cryptographically bound to another one, making it difficult and expensive to verify such connection.

SUMMARY

From the foregoing, it may be appreciated by those skilled in the art that a need has arisen to create an identity architecture that allows a user to have multiple identities and for these identities to be certified by more than one identity provider. In accordance with the present disclosure, a method and system for creating a certificate to authenticate a user identity are provided that greatly reduce and substantially eliminate the problems associated with conventional identity systems.

According to an embodiment, a method for creating a certificate to authenticate a user identity at a web browser includes receiving a login request including a first user identity for a user and generating a first browser-signed certificate using public and secret keys associating the first user identity to the web browser. The first browser-signed certificate is sent to a first identity provider server and in response a first server-signed certificate is received from the first identity provider server. The first server-signed certificate associates the first user identity to the first identity provider server. A final certificate is generated by merging the first browser-signed certificate with the first server-signed certificate.

According to another embodiment, an identity provider server for creating a certificate to authenticate a user identity includes a network interface configured to receive a first browser-signed certificate from a browser. The first browser-signed certificate associates a first user identity to the browser. A processor is configured to generate a first server-signed certificate from the first browser-signed certificate using public and secret keys associating the first user identity to the first identity provider server. The network interface is configured to send the first server-signed certificate to the browser.

The present disclosure describes many technical advantages over conventional identity systems. For example, one technical advantage is to establish a single certificate for a user that is applicable to multiple user identities. Another technical advantage is to cross-certify user certificates across multiple identity providers. Yet another technical advantage is to use and modify certificates during call authentication. Other technical advantages may be readily apparent to and discernable by those skilled in the art from the following figures, description, and claims.

BRIEF DESCRIPTION OF THE DRAWINGS

For a more complete understanding of the various embodiments of the present invention and the advantages thereof, reference is now made to the following description taken in conjunction with the accompanying drawings, wherein like reference numerals represent like parts, in which.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is generally conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

Figure 1:
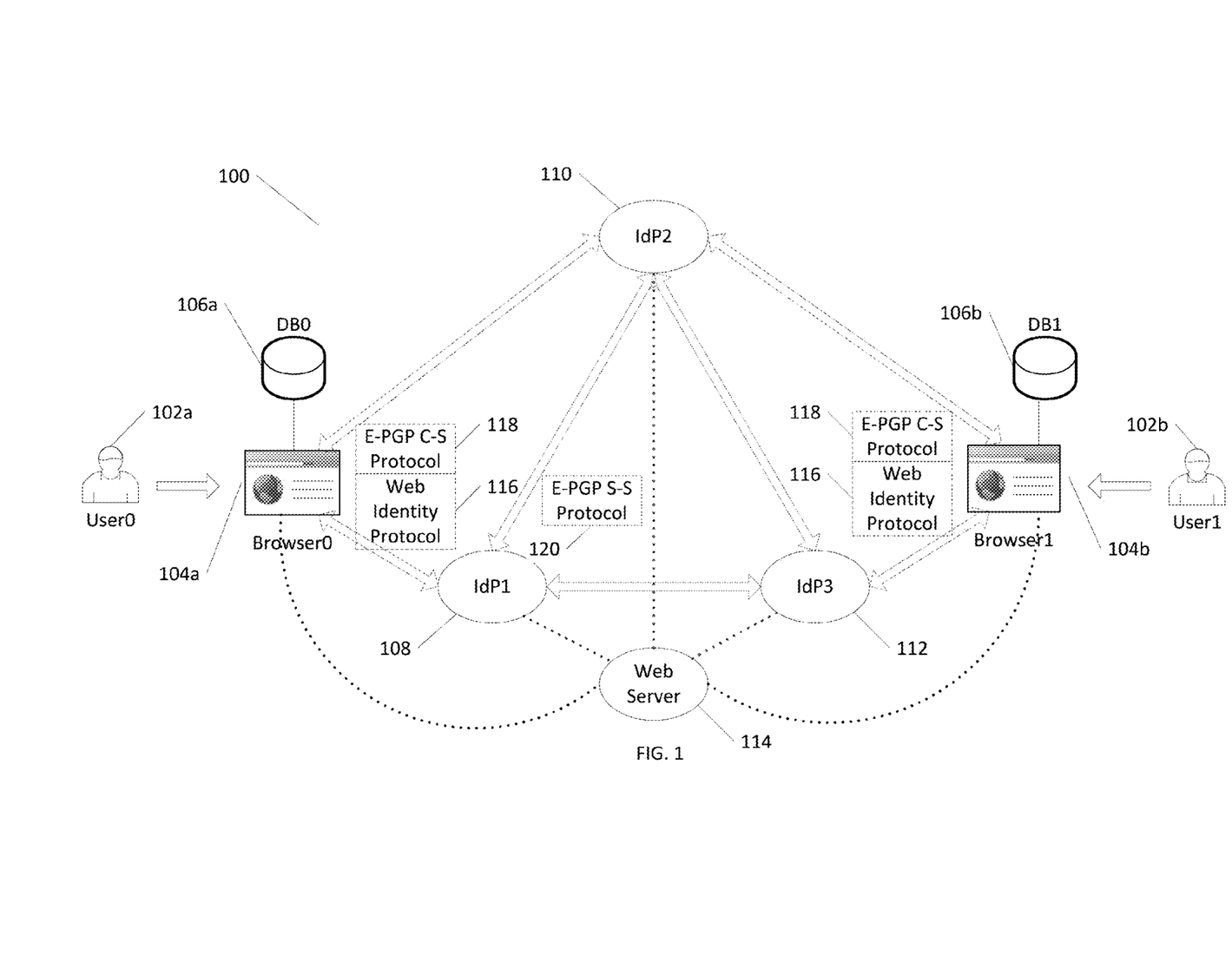
FIG. 1 illustrates an identity architecture according to embodiments of the present disclosure.

FIG. 1 illustrates an example identity architecture 100. Identity architecture 100 may be used in a variety of scenarios, including web real-time communications (WebRTC) applications. Identity architecture 100 includes users 102 (User0 102a and User1 102b), browsers 104 (Browser0 104a and Browser1 104b), databases 106 (DB0 106a and DB1 106b), and identity provider (IdP) servers (IdP1 server 108, IdP2 server 110, and IdP3 server 112). Identity architecture 100 also includes a web server 114 providing the WebRTC and other applications. According to one aspect, embodiments of the present disclosure provide a method to certify and verify a user identity in a WebRTC architecture. In an embodiment, a user 102 (User0 102a) logs into an identity provider server IdP1 108 through a browser 104 (Browser0). Browser0 104 interfaces with IdP1 server 108 using a Web Identity Protocol 116 corresponding to a login account User0 102 has with IdP1 server 108. Browser0 104 interfaces with IdP1 server 108 to create and certify a first Extended Pretty Good Privacy (E-PGP) certificate for User0 102. The E-PGP certificate is certified at both Browser0 104 and IdP1 server 108 using an E-PGP Client-Server Protocol 118. Browser0 104 then interfaces with IdP2 server 110 using Web Identity Protocol 116 and E-PGP Client-Server Protocol 118 to certify the first E-PGP certificate, create a second E-PGP certificate, and merge the first and second E-PGP certificates into a single certificate. In creating the second E-PGP certificate, IdP2 server 110 interfaces with IdP1 server 108 using an E-PGP Server-Server Protocol 120.

E-PGP Client-Server Protocol 118 allows a browser to certify multiple user identities and aliases with many IdP servers. E-PGP Server-Server Protocol 120 allows E-PGP certificates to be cross-certified among IdP servers. Through E-PGP Client-Server Protocol 118 and E-PGP Server-Server Protocol 120, a web browser may ask multiple IdP servers to cross-certify an E-PGP certificate for the user they authenticate. Web browsers may then authenticate users and certify each other using the E-PGP certificates in Peer-to-Peer (P2P) communications (e.g. making WebRTC calls). A user identity may be verified by different paths in the identity architecture 100 in the event a failure occurs in a particular IdP server. Multiple user identities may be included in one E-PGP certificate. E-PGP certificates can work in client-server, server-server, and peer-to-peer (P2P) architectures.

Pretty Good Privacy (PGP) is a data encryption and decryption program that provides cryptographic privacy and authentication for data communication. PGP is often used for signing, encrypting, and decrypting texts, e-mails, files, directories, and whole disk partitions and to increase the security of e-mail communications. Each user has an encryption key that is publicly known and a secret key that is known only to that user. A message sent by a sender uses the public key of the recipient for encryption. When received, the message is decrypted using the recipient's secret key. PGP uses a fast encryption algorithm to encrypt the message with a session key, a one-time use only secret key. The session key is encrypted with the recipient's public key. Both the encrypted message and the session key are sent to the recipient who first uses the recipient's secret key to decrypt the session key and then uses the session key to decrypt the message. When sending digital signatures, PGP uses an efficient algorithm that generates a hash (a mathematical summary) or fingerprint from the user's name and other signature information. This fingerprint hash code is then encrypted with the sender's secret key. The receiver uses the sender's public key to decrypt the hash code. If it matches the hash code sent as the digital signature for the message, the receiver is sure that the message has arrived securely from the stated sender.

Digital certificates, or certs, simplify the task of establishing whether a public key truly belongs to the purported owner. A digital certificate is data that functions much like a physical certificate. A digital certificate is information included with a person's public key that helps others verify that a key is genuine or valid. Digital certificates are used to thwart attempts to substitute one person's key for another. A digital certificate includes three things—a public key, certificate information ("Identity" information about the user, such as name, user ID, and so on), and one or more digital signatures. The purpose of the digital signature on a certificate is to state that the certificate information has been attested to by some other person or entity. The digital signature does not attest to the authenticity of the certificate as a whole, only that the signed identity information goes along with, or is bound to, the public key.

Figure 2:
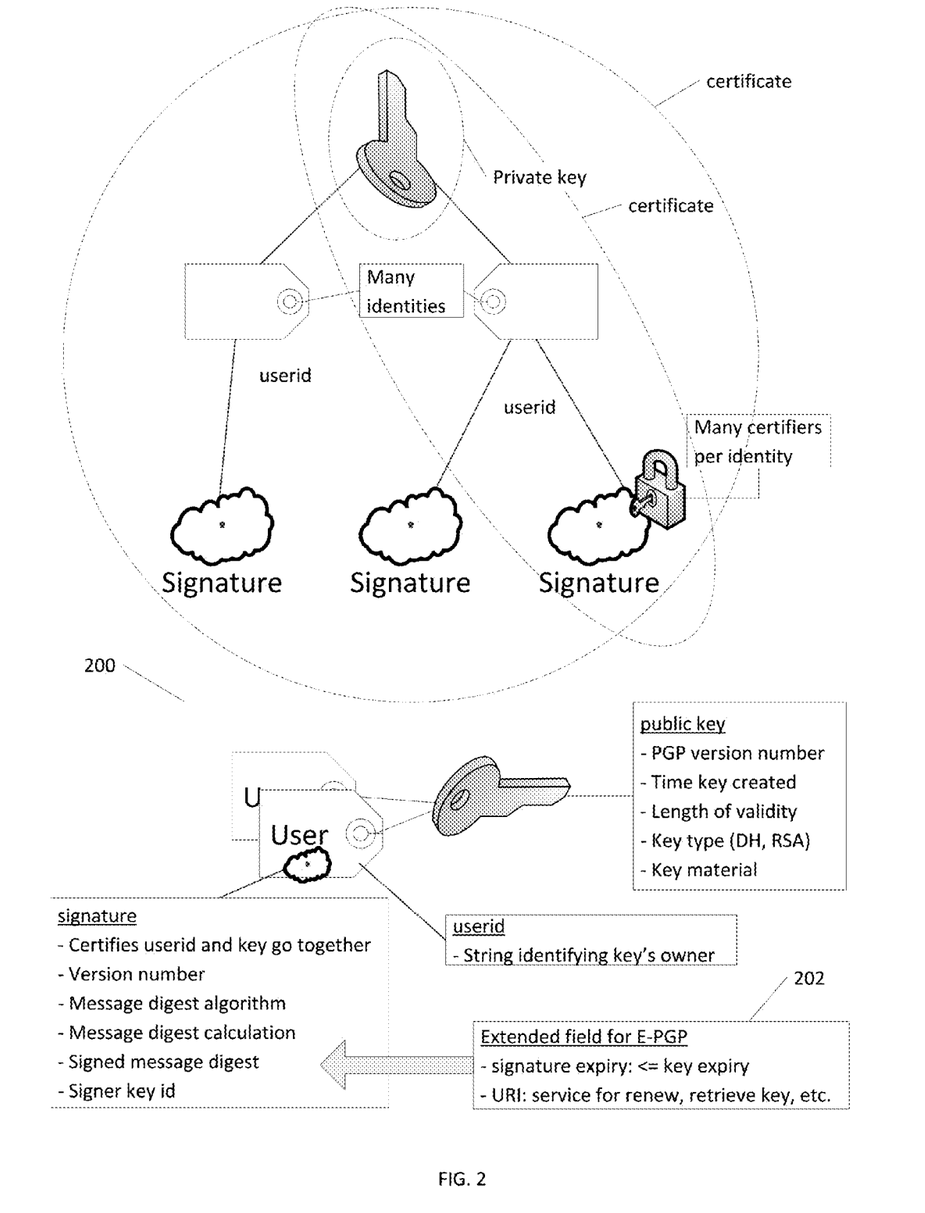
FIG. 2 depicts an Extended Pretty Good Privacy (E-PGP) certificate scheme used in the identity architecture.

FIG. 2 shows an example of an E-PGP certificate. A standard PGP certificate 200 includes (but is not limited to) the following information—a PGP version number, a certificate holder's public key, a certificate holder's information, a digital signature of the certificate holder, a certificate's validity period, and a preferred symmetric encryption algorithm for the public key. The PGP version number identifies which version of PGP was used to create the key associated with the certificate. The certificate holder's public key is the public portion of a key pair together with the algorithm of the key such as Rivest-Shamir-Adleman (RSA), DH (Diffie-Hellman), or DSA (Digital Signature Algorithm). The certificate holder's information includes "identity" information about the user, such as name, user ID, photograph, and so on. The digital signature of the certificate owner, also called a self-signature, is the signature using the corresponding private (or secret) key of the public key associated with the certificate. The certificate's validity period is the start date/time and expiration date/time indicating when the certificate will expire. The preferred symmetric encryption algorithm for the key indicates the encryption algorithm to which the certificate owner prefers to have information encrypted. Supported algorithms include Carlisle Adams Stafford Tavares (CAST), International Data Encryption Algorithm (IDEA), and Triple Data Encryption Standard (3DES).

A standard PGP certificate is a public key with one or more 'labels' tied to it. On these 'labels' is information identifying the owner of the key and a signature of the key's owner, which states that the key and the identification go together. One unique aspect of the PGP certificate format is that a single certificate can contain multiple signatures. Several or many people may sign the key/identification pair to attest to their own assurance that the public key definitely belongs to the specified owner. Some PGP certificates include a public key with several labels, each of which contains a different means of identifying the key's owner (for example, the owner's name and corporate email account, the owner's nickname and home email account, a photograph of the owner—all in one certificate). The list of signatures of each of those identities may differ; signatures attest to the authenticity that one of the labels belongs to the public key, not that all the labels on the key are authentic.

An E-PGP certificate 202 is a standard PGP certificate with added fields. The added fields include a signature expiry field and a user resource information field. The signature expiry field allows a certifier to control the validity of an identity independent of the lifetime of the certificate and other certifiers. Each certifier of a certificate may specify a period of time that its respective certification is valid. Expiration of one certifier's period of time will not invalidate the certificate as long as another certifier's expiration time has not been reached. For example, certifier A certifies cert_{x} for 5 hours while certifier B certifies cert_{x} for 30 days. In this manner, there is no need to create two certificates, one for A and one for B, in order to have different expiry periods. Therefore, embodiments of the present disclosure provide a means of avoiding unnecessary certificate invocation that invalids all associated private keys and cached copies. The user resource information field provides services for renewal of certificates and key retrieval.

Figure 3:
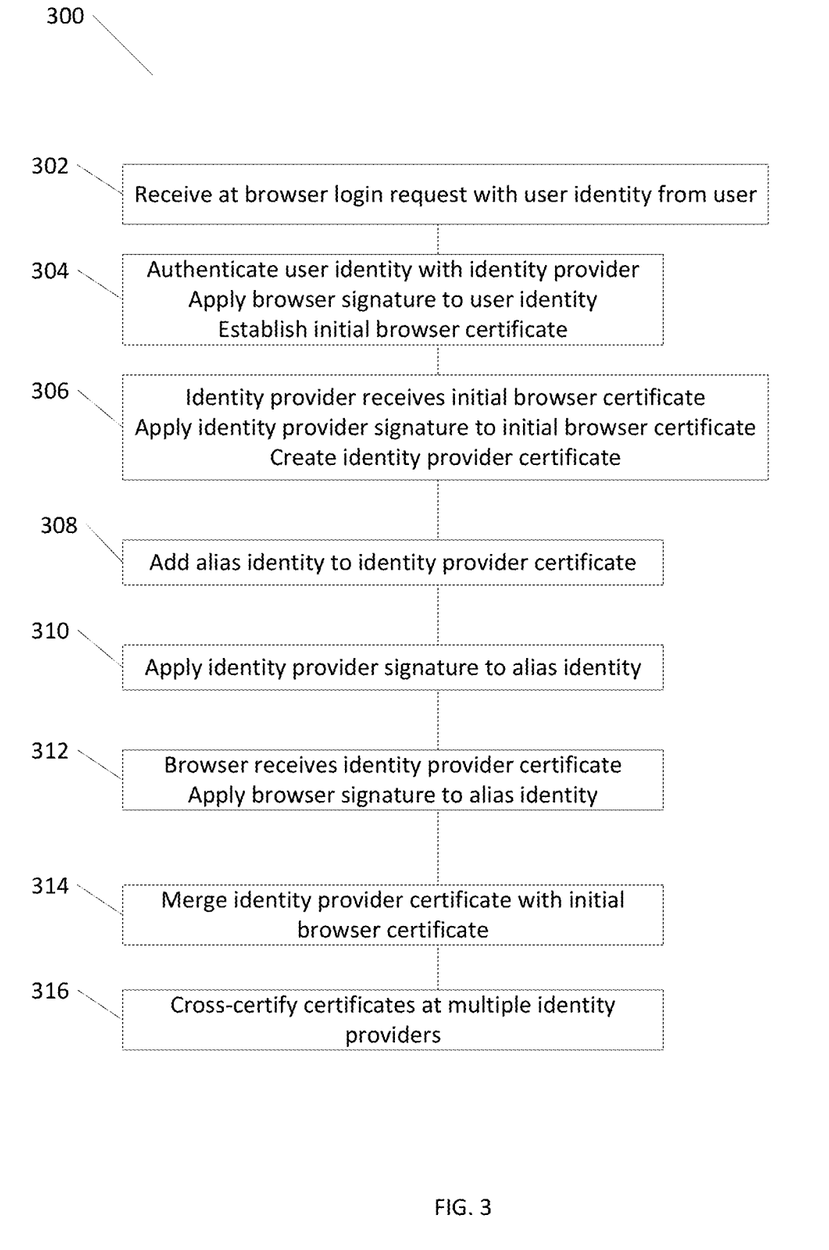
FIG. 3 illustrates an exemplary process according to an embodiment of the present disclosure.

FIG. 3 shows a general process flow 300 for creating a certificate to authenticate a user identity. Process flow 300 begins by receiving at a browser 104a a login request with a user identity from a user 102a at block 302. The browser 104a authenticates the user identity with an identity provider 108 at block 304 and establishes an initial browser-signed certificate by applying a browser signature to the user identity. The identity provider 108 receives the initial browser certificate from the browser 104a and applies its identity provider signature to the initial browser certificate at block 306, creating an identity provider server-signed certificate. The identity provider 108 may also associate an alias identity to the user. At block 308, identity provider 108 adds an alias identity to the identity provider server-signed certificate. Identity provider 108 applies its identity provider signature to the alias identity in the identity provider server-signed certificate at block 310. At block 312, browser 104a receives the identity provider server-signed certificate and applies its browser signature to the alias identity therein. At block 314, browser 104a merges the identity provider server-signed certificate with the initial browser-signed certificate to obtain a final browser-signed certificate for use in certifying the various identities of user 102a. Cross-certification is performed at block 316 between identity providers so that interactions between users, such as WebRTC calls, can be readily authenticated.

Figure 4:
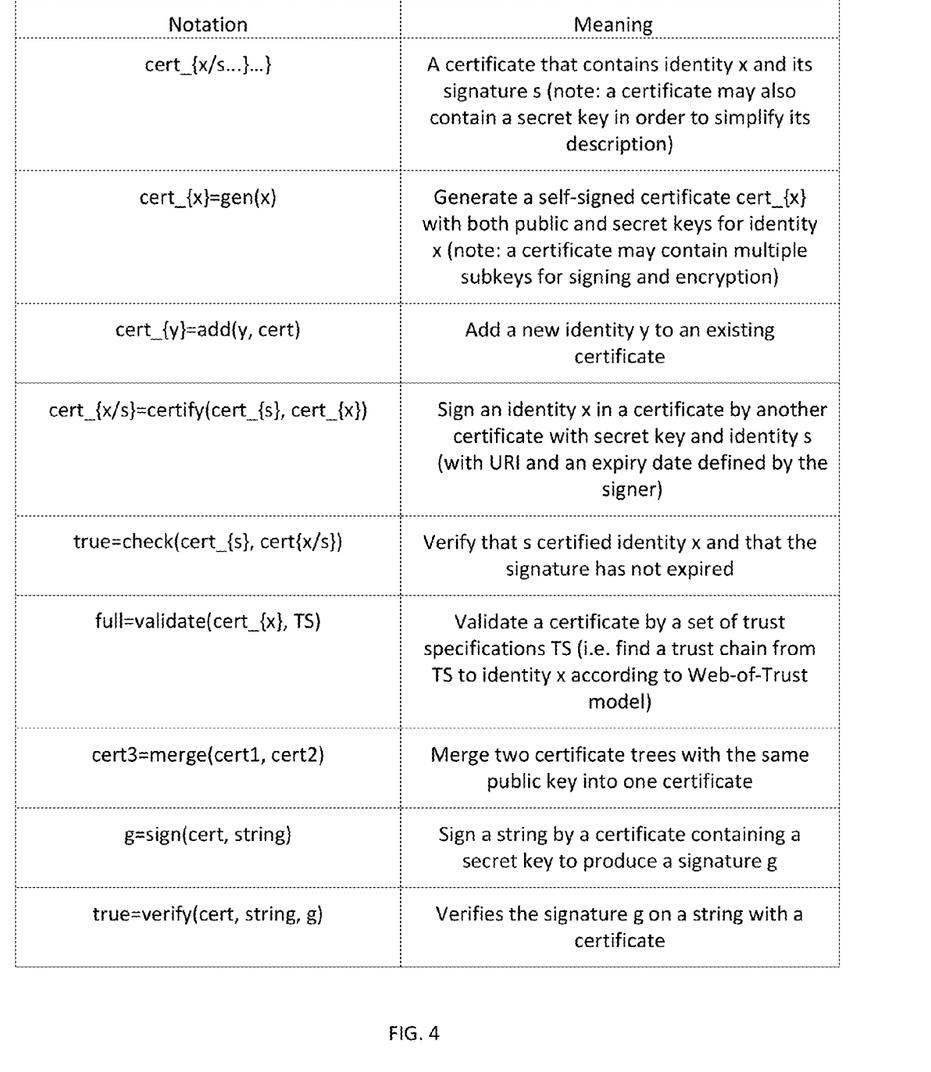
FIG. 4 illustrates a table of E-PGP security primitives used in the identity architecture.

FIG. 4 shows an example application programming interface for E-PGP certificate management. The example primitives shown in FIG. 4 specify a certificate tree format, generation of a self-signed certificate, adding a new identity (or alias) to an existing certificate, sign an identity in one certificate by another certificate, verify that an identity has been certified and signature is not expired, validate a certificate by a set of trust specifications, merge two certificate trees into one certificate, sign a string by a certificate to produce a signature, and verify a signature on a string with a certificate. In one aspect, the certification generation and expansion processes are independent of login protocols used by the IdP provided certain criteria exist, e.g., as long as the IdP accepts a user identifier that can be used in an E-PGP certificate. In an embodiment, the user need only authenticates to an IdP once until expiry. The example primitives are compatible with current the PGP standard and several implementations (e.g. OpenPGP and GnuPGP), with minor modifications that do not change any cryptographic algorithms. These example primitives are used in the methods and protocols described herein to provide user authentication and certification between web browsers and IdP servers and also between web browsers.

Figure 5:
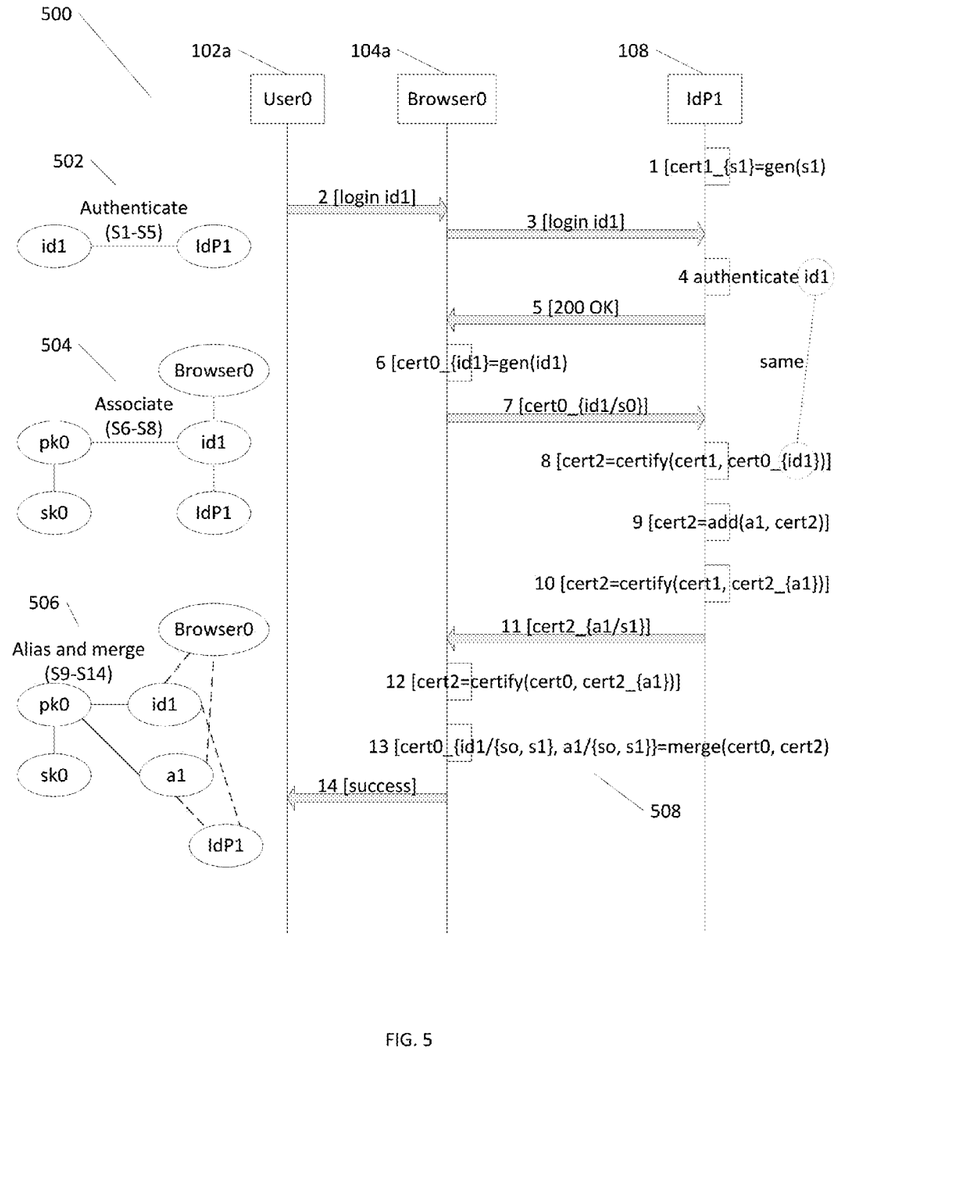
FIG. 5 depicts a workflow for generating an identification certificate for a user in the identity architecture.

FIG. 5 shows an example workflow 500 of E-PGP Client-Server Protocol 118 for generating an identification certificate. Workflow 500 is divided into three sections—authentication 502, certificate association 504, and alias generation and certificate merge 506. Authentication section 502 is performed in Steps 1-5. IdP1 server 108 generates its own certification cert1 with its signature s1 of public and secret keys (Step 1). User0 102a logs into IdP1 server 108 through Browser0 104a using its identity id1 (Steps 2 and 3). IdP1 server 108 authenticates id1 (Step 4) and informs Browser0 104a (Step 5) of the successful authentication.

Certificate association section 504 is performed in Steps 6-8. Browser0 104a generates a browser-signed certification cert0 for identity id1 with its signature s0 of public and secret keys (Step 6) and transmits browser-signed certification cert0 to IdP1 server 108 (Step 7). IdP1 server 108 generates a server-signed certification cert2 by associating its certification cert1 and signature s1 of public and private keys with identity id1 of certification cert0 (Step 8). IdP1 server 108 has now signed identity id1 with its signature s1. IdP1 server 108 also includes the expiry field and uniform resource information field in generation of server-signed certification cert2.

Alias generation and certificate merge section 506 is performed in Steps 9-14. IdP1 server 108 may associate one or more alias identities to User0 102a. For the example shown, one alias identity a1 is being added to server-signed certification cert2 (Step 9). Alias identity a1 is used to mask true identity id1 of User0 102a. IdP1 server 108 then binds alias identity a1 to its certification cert1 and signature s1 in server-signed certification cert2 (Step 10). IdP1 server 108 sends server-signed certification cert2 with verified identities id1 and a1 to Browser0 104a (Step 11). Browser0 104a applies its signature to alias identity a1 and inserts signature expiry and uniform resource information fields into server-signed certification cert2 (Step 12). Browser0 104a merges its originally created browser-signed certification cert0 with server-signed certification cert2, originally created by IdP1 server 108 and modified by Browser0 104a, to create a final E-PGP certificate 508. Browser-signed certification cert0 and server-signed certification cert2 have the same public key since certification cert2 was derived from certification cert0 by adding an alias and signatures. Browser-signed certification cert0 now has identity id1 and alias identity a1 signed by Browser0 104a and IdP1 server 108.

Figure 6A:
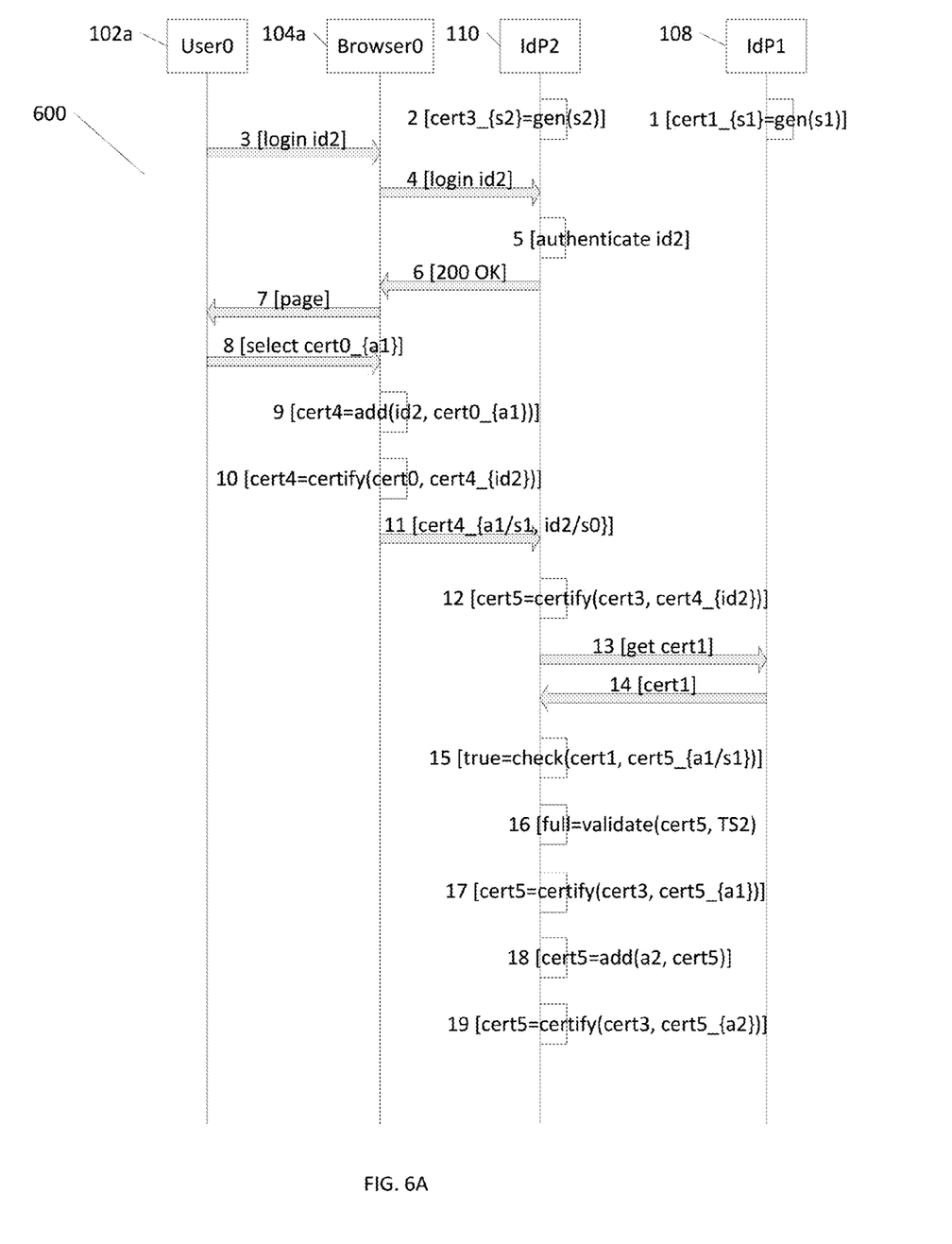
FIGS. 6A-6B illustrate a workflow to expand a certificate by cross-certification across identity providers in the identity architecture.

FIGS. 6A-6B show an example workflow 600 of E-PGP Server-Server Protocol 120 for cross-certification of certificates at multiple IdP servers. Workflow 600 allows IdP servers 108 to cross-certify E-PGP certificates. Beginning in FIG. 6A, IdP1 server 108 generates its own certification cert1 with its signature s1 of public and secret keys (Step 1) as before. IdP2 server 110 generates its own certification cert3 with its signature s2 of public and secret keys (Step 2). User0 102a logs into IdP2 server 110 through Browser0 104a using its identity id2 (Steps 3 and 4). IdP2 server 110 authenticates id2 (Step 5) and informs Browser0 104a (Step 6) of the successful authentication. In one aspect, users can use a particular IdP server for authentication, such as IdP2 server 110, without completely trusting the particular IdP server. A user may hide his/her true identity (e.g. routable email address) from a third party IdP server by using an alias. Advantageously, this may lead to reduction in junk mail and/or calls received. In this instance, Browser0 104a will use alias identity a1 for certification purposes (Steps 7 and 8). Browser0 104a creates browser-signed certification cert4 to add identity id2 to browser-signed certification cert0 for association with alias identity a1 (Step 9). Browser0 104a applies its signature s0 to identity id2, including populating the signature expiry field and uniform resource information field associated with identity id2 for browser-signed certification cert4 (Step 10). The newly created browser-signed certification cert4 is provided to IdP2 server 110 (Step 11).

IdP2 server 110 applies its signature s2 to identity id2 to create server-signed certification cert5 (Step 12). IdP2 server 110 recognizes that browser-signed certification cert4 is tied to certification cert1 of IdP1 server 108 and alias identity a1. IdP2 server 110 requests and receives certification cert1 from IdP1 server 108 (Steps 13 and 14). IdP2 server 110 checks that IdP1 server 108 certified alias identity a1 and that the signature has not expired (Step 15). IdP2 server 110 validates server-signed certification cert5 using trust specifications (Step 16). Upon validation, IdP2 server 110 signs alias identity a1 with its signature s2 (Step 17) and adds the signature expiry and uniform resource information fields as desired. At this point in time, IdP2 server 110 may add a second alias identity a2 for User0 102a to server-signed certification cert5 (Step 18). If so, IdP2 server 110 signs alias identity a2 with its signature s2 (Step 19) and adds the signature expiry and uniform resource information fields as desired.

Figure 6B:
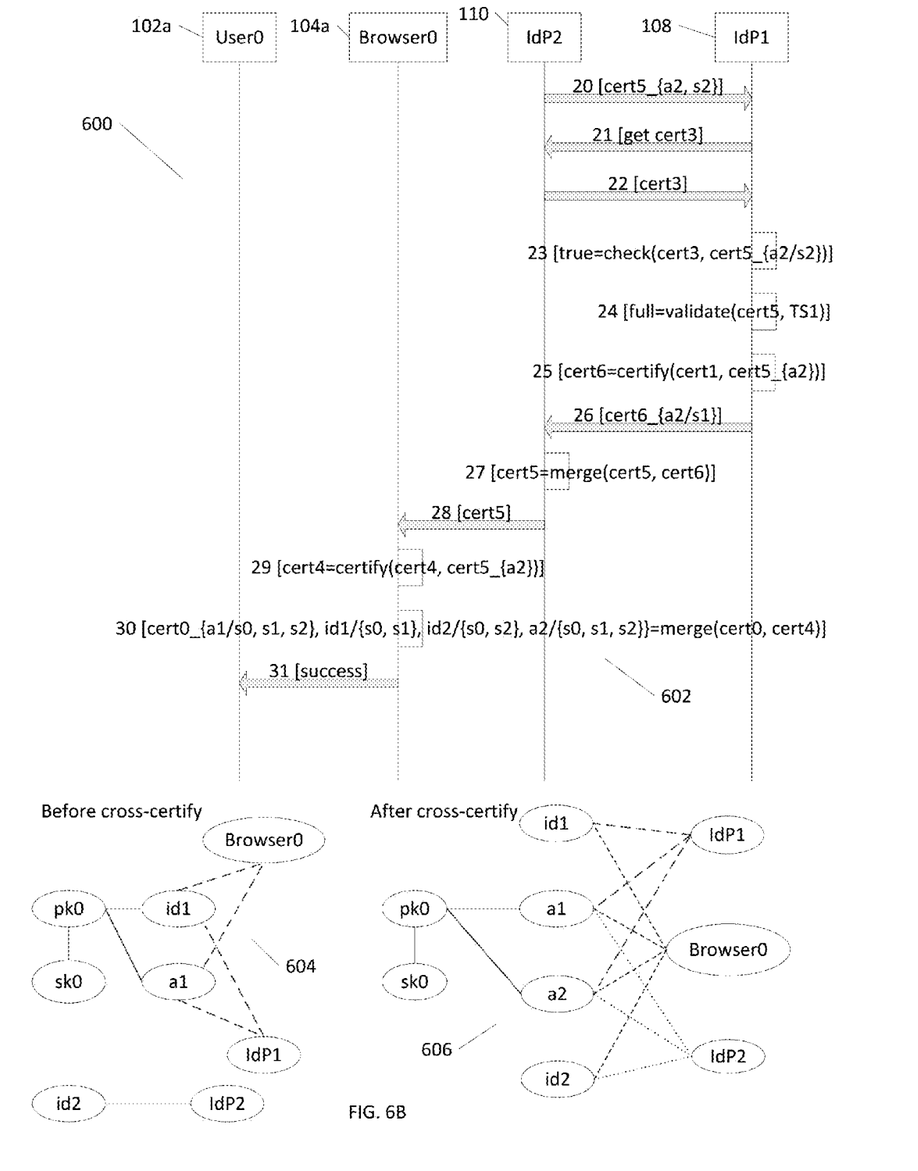

Moving to FIG. 6B, server-signed certification cert5 is sent by IdP2 server 110 to IdP1 server 108 (Step 20). IdP1 server 108 now goes through the process of certifying server-signed certification cert5 and alias identity a2. IdP1 server 108 recognizes that server-signed certification cert5 is tied to certification cert3 of IdP2 server 110 and alias identity a2. IdP1 server 108 requests and receives certification cert3 from IdP2 server 110 (Steps 21 and 22). IdP1 server 108 checks that IdP2 server 110 certified alias identity a2 and that the signature has not expired (Step 23). IdP1 server 108 validates server-signed certification cert5 using trust specifications (Step 24). Upon validation, IdP1 server 108 signs alias identity a2 with its signature s1 (Step 25) and adds the signature expiry and uniform resource information fields as desired to create server-signed certification cert6. At this point, IdP1 server 108 has signed and verified identity id1, alias identity a1, and alias identity a2. IdP1 server 108 sends server-signed certification cert6 to IdP2 server 110 (Step 26). IdP2 server 110 merges server-signed certification cert6 received from IdP1 server 108 with server-signed certification cert5 (Step 27). At this point, IdP2 server 110 has signed and verified identity id2, alias identity a1, and alias identity a2.

The merged server-signed certification cert5 is sent to Browser0 104a (Step 28). Browser0 104a applies its signature s0 to alias identity a2, including populating the signature expiry field and uniform resource information field associated with alias identity a2 for browser-signed certification cert4 (Step 29). Browser0 104a merges its originally created browser-signed certification cert0 with browser-signed certification cert4 to create a final E-PGP certificate 602 (Step 30). Browser-signed certification cert0 and browser-signed certification cert4 have the same public key since browser-signed certification cert4 was derived from certification cert0 by adding an identity id2, an alias identity a2, and signatures. Browser-signed certification cert0 now has identity id1 signed by Browser0 104a and IdP1 server 108, identity id2 signed by Browser0 104a and IdP2 server 110, and alias identities signed by Browser0 104a, IdP1 server 108, and IdP2 server 110. User0 102a is notified of the completion of the cross-certification process (Step 31). FIG. 6B shows the before cross certification state 604 prior to execution of E-PGP Server-Server Protocol 120 and the after cross-certification state 606 upon completion of E-PGP Server-Server Protocol 120.

Figure 7:
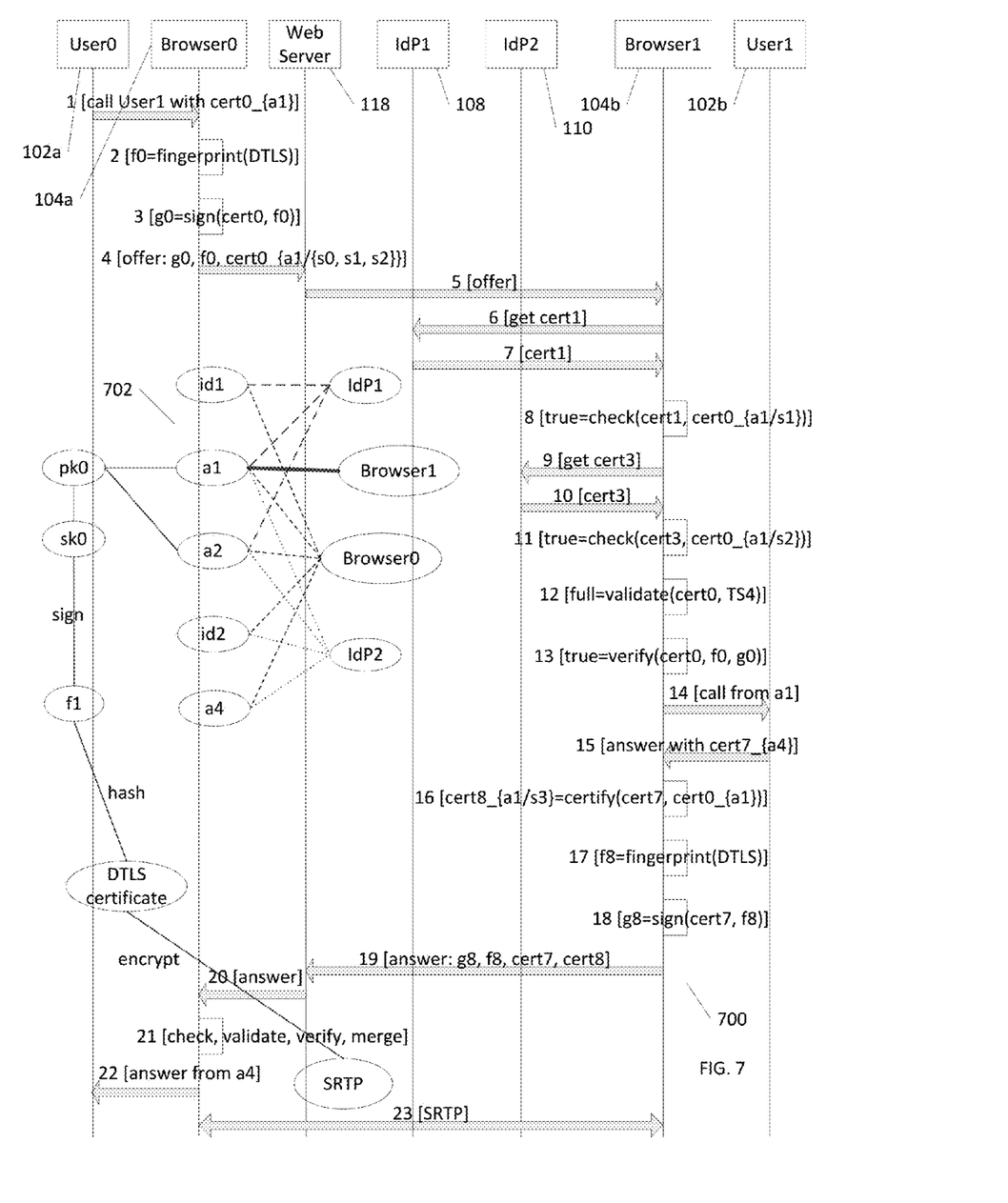
FIG. 7 illustrates a workflow to use and expand a certificate in a call between browsers in the identity architecture.

FIG. 7 shows an example workflow 700 using an E-PGP certificate to authenticate a WebRTC call. Workflow 700 begins by User0 102a initiating a call offer to User1 102b using alias identity a1 (Step 1). Upon receiving the call offer request from User0 102a, Browser0 104a generates a Datagram Transport Layer Security (DTLS) protocol fingerprint f0 of the E-PGP certificate for the call (Step 2). The fingerprint is a hash of the user's certificate and appears as one of the certificate's properties. The DTLS fingerprint binds the DTLS key exchange in the media plane to the signaling plane. User1 102b is able to verify that the caller's User0 102a certificate used for authentication in the DTLS handshake can be associated to the certificate fingerprint contained in the call offer. When User1 102b accepts the call offer, an answer back is provided to User0 102a to including the User1 102b fingerprint. User0 102a can accept or reject the User1 102b certificate and, if accepted, indicate to User1 102b that the media is secured.

Browser0 104a signs the certification cert0 and fingerprint f0 (Step 3). Browser0 104a forwards the call offer, including the signatures, fingerprint, and certification, to web server 114 having the call application (Step 4). Web server 114 processes the call offer and forwards the call offer to Browser1 104b (Step 5). Upon recognizing that browser-signed certification cert0 is tied to certifications cert1 and cert3, Browser1 104b requests and receives certification cert1 from IdP1 server 108 (Steps 6 and 7). Browser1 104b checks that IdP1 server 108 certified alias identity a1 and that the signature has not expired (Step 8). Browser1 104b requests and receives certification cert3 from IdP1 server 110 (Steps 9 and 10). Browser1 104b checks that IdP2 server 110 certified alias identity a1 and that the signature has not expired (Step 11). Browser1 104b validates browser-signed certification cert0 using trust specifications (Step 12). Browser1 104b verifies the signature, fingerprint, and certificate provided by Browser0 104a (step 13). Upon verification, Browser1 104b forwards the call to User1 102b.

If User1 102b accepts the call, Browser1 104b associates the call with its browser-signed certification cert7 and an alias identity a4 associated with User1 102b (Step 15). Browser signed certification cert7 and alias identity a4 were previously generated in Browser1 104b in a similar manner as the certificate and alias identity generation for Browser0 104a as discussed above for example in an interaction with IdP2 server 110. Browser1 104b applies its signature s3 to alias identity a2 to create browser-signed certification cert8 (Step 16). Browser1 104b generates a DTLS protocol fingerprint f8 of browser-signed certification cert8 for the call (Step 17). Browser0 104b signs the browser-signed certification cert8 and fingerprint f8 (Step 18). Though not shown specifically here, Browser1 104b may perform a merge function to combine certifications cert0, cert1, and cert3 to create a final E-PGP certificate specifically for Browser 104b.

Browser1 104b forwards a call answer, including the signatures, fingerprint, and certification, to web server 114 (Step 19). Web server 114 processes the answer and forwards the answer to Browser0 104a (Step 20). Browser0 104a performs the check, validate, verify, and merge steps as previously described so that Browser0 104a can update its E-PGP certificate with an association to alias identity a4 (Step 21). Browser0 104a forwards the answer to User0 102a (Step 22). The call proceeds between User0 102a and User1 102b through Browser0 104a and Browser1 104b using a Secure Real-time Transport Protocol (SRTP) (Step 23). Call state 702 shows the certificate binding upon establishing a call between User0 102a and User1 102b. Browser1 104b now has a direct association with alias identity a1 of User0 102a. Browser1 104b is now able to certify alias identity a1 directly. A further cross-certification process may be performed using E-PGP Server-Server Protocol 120 to update respective E-PGP certificates.

Frequent uses of E-PGP certificates may shorten the processing path between among entities in identity architecture 100. For example, a path between entity A to entity C through entity B can be reduced to a direct entity A to entity C path. As shown, an added certification relation, Browser1 to identity a1, reduces the path length for Browser1 to certify an identity on a subsequent call. Advantageously, multiple and hybrid authentication paths for an identity increases the usability of the identity and the robustness of the system.

Figure 8:
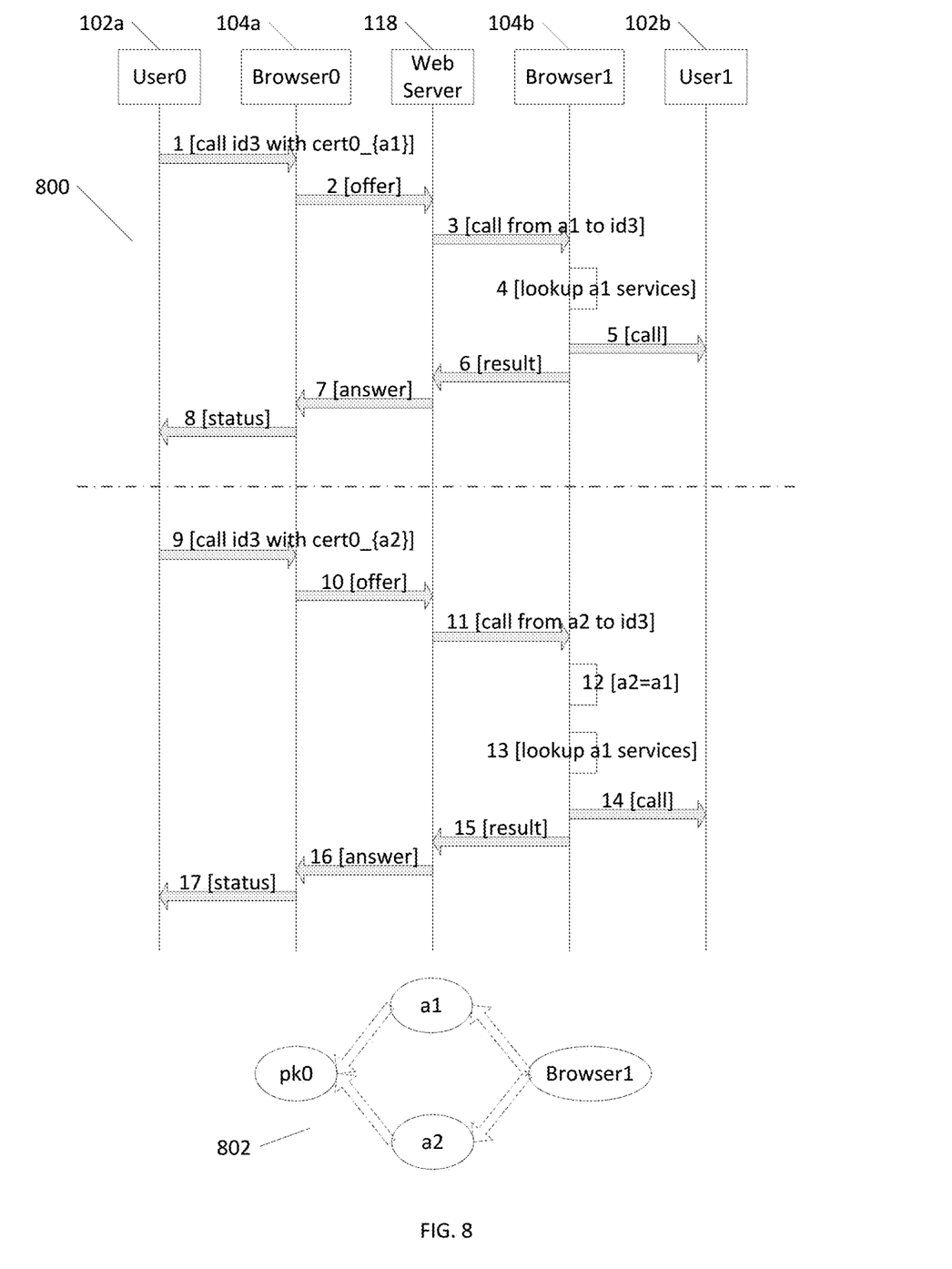
FIG. 8 illustrates a method to link different web identities with a certificate in a call between browsers.

FIG. 8 shows an example simplified workflow 800 indicating how different web identities are linked by a single E-PGP certificate. Workflow 800 begins by User0 102a placing a call to User1 102b using alias identity a1 (Step 1). Browser0 104a process the call request and provides a call offer to web server 114 (Step 2). Web server 114 process the call offer and forwards the call offer to, in this instance, Browser1 104b (Step 3). Browser 104b processes alias identity a1 of the call offer as discussed above (Step 4). The call offer is provided to User1 102b (Step 5). Upon the call offer being accepted, Browser1 104b processes the certifications as discussed above and forwards the result to web server 114 (Step 6). Web server 114 provides the call answer to Browser0 104a (Step 7) and User0 102a is provided with the call particulars for communication with User1 102b (Step 8).

User0 102a places a second call to User1 102b using alias identity a2 (Step 9). Browser0 104a process the call request and provides a call offer to web server 114 (Step 10). Web server 114 process the call offer and forwards the call offer to, in this instance, Browser1 104b (Step 11). Browser1 104b processes alias identity a2 and determines from the E-PGP certificate that alias identity a1 is the same as alias identity a2. (Step 12). Browser1 104b links alias identity a1 with alias identity a2 and processes the call offer in the manner discussed above (Step 13). The call offer is provided to User1 102b (Step 14). Upon the call offer being accepted, Browser1 104b processes the certifications as discussed above and forwards the result to web server 114 (Step 15). Web server 114 provides the call answer to Browser0 104a (Step 16) and User0 102a is provided with the call particulars for communication with User1 102b (Step 17).

A call state 802 shows how Browser1 104b recognizes identity equivalence between two identities having the same public key. Identity equivalence provides advantages for avoiding broken paths. For example, workflow 800 illustrates an example broken path avoidance. A call using an E-PGP certificate corresponding to alias identity a1 may fail. A subsequent call can be made using an E-PGP certificate corresponding to alias identity a2. In an embodiment, identity equivalence provides a mechanism to change identity for personal, privacy, or business reasons. Embodiments of the present disclosure provide identity-based call history and call control services (e.g. call blocking), including automatic re-authentication.

There are several differences between certificates generated according to embodiments of the present disclosure and those generated by other techniques such as PGP, Browser ID, and Convergence. Under PGP, PGP libraries (e.g., OpenPGP and GnuPGP) are mostly used with email clients to sign and encrypt email messages for privacy purposes and not with any identity system as provided by embodiments of the present disclosure. The PGP libraries do not define the system or network protocols to invoke the primitives in the API to authenticate and certify users, whereas embodiments of the present disclosure function at the system and protocol level. Further, embodiments of the present disclosure provide additional features, e.g., signature URI and expiry, to the standard PGP certificate. BrowserID uses a PKI-style certificate which allows only one identity and one signature, whereas embodiments of the present disclosure may uses an E-PGP-style certificate allowing for many identities with many signatures. BrowserID only allows a user to authenticate a browser to a web server, whereas embodiments of the present disclosure may also allow a user to authenticate one browser to another. BrowserID has a single fallback IdP server, whereas embodiments of the present disclosure may have many IdP servers capable of processing the E-PGP certificate as desired. BrowserID does not provide other features, e.g. change identity, enabled by embodiments of the present disclosure. Unlike the ability to expand an E-PGP certificate as disclosed herein, BrowserID does not permit changes to the PKI-style certificate once it has been created. BrowserID does not support the disclosed cross-certification between IdP servers or identity selection and alias generation. For Convergence, a set of Notary servers is used to check the certificate of a single website. However, Convergence allows web browsers to authenticate web servers and does not allow for peer-to-peer mutual authentications between web browsers. Convergence uses existing PKI X.509 certificates with no ability to change a certificate. The notary servers have no function allowing for cross-certification to appropriately adjust E-PGP certificates.

Figure 9:
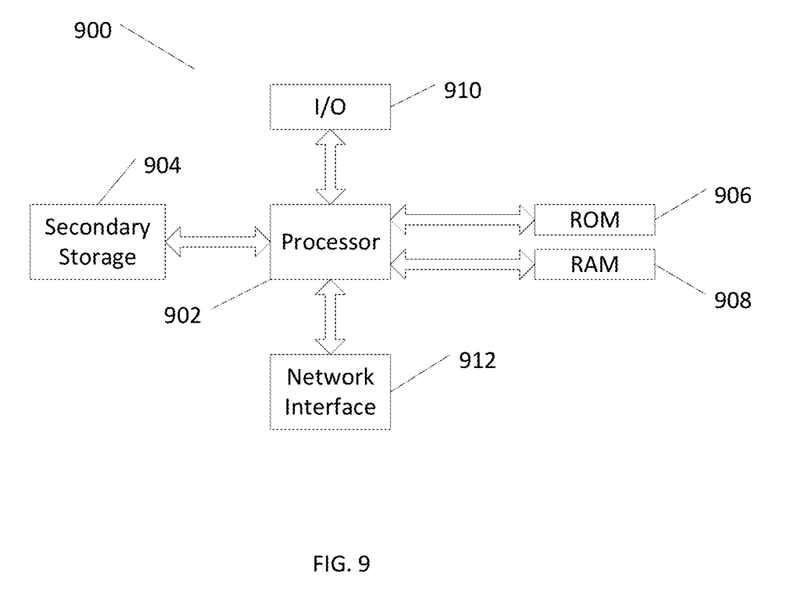
FIG. 9 illustrates a diagram of network components for implementing a browser and/or identity provider server.

FIG. 9 illustrates a typical, general-purpose network component 900 suitable for implementing a browser and/or an identity provider server according to one or more embodiments disclosed herein. The browser and identity provider functionality described above may be implemented on any general-purpose network component, such as a computer or network component with sufficient processing power, memory resources, and network throughput capability to handle the necessary workload placed upon it. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network interface devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

In an example configuration, Browser0 104a may be implemented in a network component 900 for creating a certificate to authenticate a user identity. In one embodiment, processor 902 receives a login request including a first user identity for a user. Processor 902 generates a first browser-signed certificate using public and secret keys associating the first user identity to the web browser. Network interface 912 sends the first browser-signed certificate to a first identity provider server. Network interface 912 receives a first server-signed certificate from the first identity provider server. The first server-signed certificate associates the first user identity to the first identity provider server. Processor 902 generates a final certificate by merging the first browser-signed certificate with the first server-signed certificate. If processor 902 identifies a first alias identity for the user in the first server-signed certificate, processor 902 signs the first alias identity of the first server-signed certificate with a browser signature. Processor 902 may also receive a login request including a second user identity for a user associated with a second identity provider server. Upon receiving a second user identity, processor 902 adjusts the final certificate to add the second user identity to the final certificate. Network interface 912 sends the adjusted final certificate to the second identity provider server and then receives a second server-signed certificate from the second identity provider server. Processor 902 merges the adjusted final certificate with the second-server signed certificate to create a final merged certificate. If a second alias identity is included in the second server-signed certificate, processor 902 signs the second alias identity of the second server-signed certificate with the browser signature.

In another example configuration, IdP1 108 may be implemented in a network component 900 for creating a certificate to authenticate a user identity. In one embodiment network interface 912 receives a first browser-signed certificate from a browser. The first browser-signed certificate associates a first user identity to the browser. Processor 902 generates a first server-signed certificate from the first browser-signed certificate using public and secret keys associating the first user identity to the first identity provider server. Network interface 912 sends the first server-signed certificate to the browser. Processor 902, upon identifying a first alias identity for the user, signs the first alias identity with an identity provider signature for inclusion in the first server-signed certificate. Network interface 912 may receive a second server-signed certificate from a second identity provider server. Processor 902 may cross-certify the second server-signed certificate with the first server-signed certificate. Processor 902 merges the second server-signed certificate with the first server-signed certificate. If the second server-signed certificate includes a second alias identity for the user, Processor 902 signs the second alias identity with the identity provider signature for inclusion in the first server-signed certificate.

In summary, embodiments of the present disclosure provide identity extensibility, multiplicity, and equivalence. A certificate according to the present disclosure allows for many identities with many signatures. Authentication paths may be extended to a certificate linking new identities and signatures. Alias identity generation for user identity authentication may be performed according to an embodiment of the present disclosure. An alias generated by one IdP server may be certified for another IdP server. The identity architecture and protocols are based on a new type of PGP certificate (E-PGP) and/or a web of trust (WoT) model. Users may grow a WoT network from trusted IdP servers despite no trust chain between them. Certificates may be expanded through alias generation and cross-certification among IdP servers. Protocols are established to incrementally certify multiple user identities and aliases with many identity providers as well as cross-certification of certificates over multiple identity provider servers.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, changes, substitutions, alterations, and permutations of these embodiments and methods will be apparent to and readily discernable by those skilled in the art without departing from the scope of this disclosure as defined by the following claims. Accordingly, the above description of example embodiments does not define or constrain this disclosure and the present invention should not be construed as being limited by such example embodiments but rather construed according to the following claims.

What is claimed is:

1. A method for creating a certificate to authenticate a user identity at a web browser, comprising:
generating, at the web browser, a first browser-signed certificate using public and secret keys associating a first user identity of a user, received with a login request, to the web browser;
sending the first browser-signed certificate to a first identity provider server;
receiving a first server-signed certificate from the first identity provider server, the first server-signed certificate associating the first user identity to the first identity provider server, wherein the first server-signed certificate includes a first alias identity for masking a true identity of the user; and
generating a final certificate by merging the first browser-signed certificate with the first server-signed certificate.

2. The method of claim 1, further comprising:
identifying the first alias identity for the user in the first server-signed certificate; and
signing the first alias identity of the first server-signed certificate with a browser signature.

3. The method of claim 1, further comprising:
receiving a login request including a second user identity for the user associated with a second identity provider server; and
adjusting the final certificate to add the second user identity to the final certificate.

4. The method of claim 3, further comprising:
sending the adjusted final certificate to the second identity provider server;
receiving a second server-signed certificate from the second identity provider server; and
merging the adjusted final certificate with the second server-signed certificate to create a final merged certificate.

5. The method of claim 4, further comprising:
identifying a second alias identity for the user in the second server-signed certificate; and
signing the second alias identity of the second server-signed certificate with a browser signature, wherein the second alias identity masks a true identity of the user.

6. The method of claim 4, wherein the final merged certificate includes a URI and a signature expiry for each identity included therein.

7. A web browser on a computing device for creating a certificate to authenticate a user identity, the computing device comprising:
a storage comprising instructions;
one or more processors in communication with the memory, wherein the one or more processors execute the instructions to:
generate, at the web browser, a first browser-signed certificate using public and secret keys associating a first user identity of a user, received with a login request, to the web browser; and
a network interface to:
send the first browser-signed certificate to a first identity provider server;
receive a first server-signed certificate from the first identity provider server, the first server-signed certificate associating the first user identity and one or more alias identities for the user to the first identity provider server, wherein the first server-signed certificate includes a first alias identity for masking a true identity of the user;
wherein the one or more processors execute the instructions to:
generate a final certificate by merging the first browser-signed certificate with the first server-signed certificate.

8. The browser of claim 7, wherein the one or more processors further execute the instructions to:
identify the first alias identity for the user in the first server-signed certificate; and
sign the first alias identity of the first server-signed certificate with a browser signature.

9. The browser of claim 7, wherein the one or more processors further execute the instructions to:
receive a login request including a second user identity for the user associated with a second identity provider server; and
adjust the final certificate to add the second user identity to the final certificate.

10. The browser of claim 9, wherein:
the network interface:
send the adjusted final certificate to the second identity provider server;
receive a second server-signed certificate from the second identity provider server;
the one or more processors further execute the instructions to merge the adjusted final certificate with the second-server signed certificate to create a final merged certificate.

11. The browser of claim 10, wherein the one or more processors further execute the instructions to:
identify a second alias identity for the user in the second server-signed certificate; and
sign the second alias identity of the second server-signed certificate with a browser signature, wherein the second alias identity masks a true identity of the user.

12. An identity provider server for creating a certificate to authenticate a user identity, comprising:
a network interface to:
receive a first browser-signed certificate, generated by a browser, from the browser, the first browser-signed certificate associating a first user identity to the browser;
a storage comprising instructions; and
one or more processors in communication with the memory, wherein the one or more processors execute the instructions to:
generate a first server-signed certificate from the first browser-signed certificate using public and secret keys associating the first user identity to the first identity provider server, wherein the first server-signed certificate includes a first alias identity for masking a true identity of the user;

merge a second server-signed certificate signed by a second identity provider server with the first server-signed certificate;

wherein the network interface sends the first server-signed certificate merged with the second server-signed certificate to the browser.

13. The identity provider server of claim 12, wherein the one or more processors further execute the instructions to:
identify the first alias identity for the user; and
sign the first alias identity with an identity provider signature for inclusion in the first server-signed certificate.

14. The identity provider server of claim 12, wherein:
the network interface receives the second server-signed certificate from the second identity provider server;
the one or more processors further execute the instructions to cross-certify the second server-signed certificate with the first server-signed certificate.

15. The identity provider server of claim 12, wherein:
the network interface receives the second server-signed certificate from the second identity provider server;
the one or more processors further execute the instructions to add signature expiry and uniform resource information to the first server signed certificate.

16. The system of claim 14, wherein the second server-signed certificate includes a second alias identity for the user, the one or more processors further execute the instructions to sign the second alias identity with the identity provider signature for inclusion in the first server-signed certificate, wherein the second alias identity masks a true identity of the user.

17. A non-transitory computer readable medium storing computer instructions for creating a certificate to authenticate a user identity at a web browser, that when executed by one or more processors, cause the one or more processors to perform the steps of:

generating, at the web browser, a first browser-signed certificate using public and secret keys associating a first user identity of a user, received with a login request, to the web browser;

sending the first browser-signed certificate to a first identity provider server;

receiving a first server-signed certificate from the first identity provider server, the first server-signed certificate associating the first user identity to the first identity provider server, wherein the first server-signed certificate includes a first alias identity for masking a true identity of the user; and generating a final certificate by merging the first browser-signed certificate with the first server-signed certificate.

18. The computer readable medium of claim 17, wherein the one or more processors further perform the steps of:
identifying the first alias identity for the user in the first server-signed certificate; and
signing the first alias identity of the first server-signed certificate with a browser signature.

19. The computer readable medium of claim 17, wherein the one or more processors further perform the steps of:
receiving a login request including a second user identity for a user associated with a second identity provider server; and
adjusting the final certificate to add the second user identity to the final certificate.

20. The computer readable medium of claim 19, wherein the one or more processors further perform the steps of:
sending the adjusted final certificate to the second identity provider server;
receiving a second server-signed certificate from the second identity provider server; and
merging the adjusted final certificate with the second-server signed certificate to create a final merged certificate.

21. The computer readable medium of claim 20, wherein the one or more processors further perform the steps of:
identifying a second alias identity for the user in the second server-signed certificate; and
signing the second alias identity of the second server-signed certificate with a browser signature, wherein the second alias identity masks a true identity of the user.

22. The computer readable medium of claim 20, wherein the final merged certificate includes a URI and a signature expiry for each identity included therein.

* * * * *